(12) United States Patent
Haba (10) Patent No.: US 6,593,906 B2
(45) Date of Patent: Jul. 15, 2003

(54) DISPLAY APPARATUS AND INFORMATION DISPLAY SYSTEM USING THE SAME

(75) Inventor: Yasunori Haba, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 207 days.

(21) Appl. No.: 09/791,636

(22) Filed: Feb. 26, 2001

(65) Prior Publication Data

US 2001/0020931 A1 Sep. 13, 2001

(30) Foreign Application Priority Data

Mar. 13, 2000 (JP) ........................................ 2000-069408
Nov. 28, 2000 (JP) ........................................ 2000-361552

(51) Int. Cl.⁷ ................................................ G09G 3/34
(52) U.S. Cl. ........................................ 345/108; 345/110
(58) Field of Search ........................... 345/108; 358/87; 353/122; 349/10; 348/789

(56) References Cited

U.S. PATENT DOCUMENTS

| | | | | |
|---|---|---|---|---|
| 4,943,851 A | * | 7/1990 | Lang et al. | 348/37 |
| 6,137,547 A | * | 10/2000 | Iijima et al. | 348/789 |
| 6,164,780 A | * | 12/2000 | Noto et al. | 353/122 |
| 6,414,728 B1 | * | 7/2002 | Faris et al. | 349/10 |

FOREIGN PATENT DOCUMENTS

| | | |
|---|---|---|
| JP | 55-22750 | 2/1980 |
| JP | 58-77331 | 5/1983 |
| JP | 61-16582 | 1/1986 |
| JP | 62-27387 | 2/1987 |
| JP | 62-113381 | 7/1987 |
| JP | 63-269190 | 11/1988 |
| JP | 3-49540 | 5/1991 |
| JP | 07-8881 | 2/1995 |
| JP | 7-16971 | 3/1995 |
| JP | 3042533 | 8/1997 |
| JP | 11-45061 | 2/1999 |

* cited by examiner

Primary Examiner—Vijay Shankar
Assistant Examiner—Nitin Patel
(74) Attorney, Agent, or Firm—Oliff & Berridge, PLC.

(57) ABSTRACT

A display apparatus includes a projection display device for enlarging and projecting an image from the back side of a display plane, a screen disposed on the front side of the display plane of the projection display device, and a screen driving device for moving the screen to thereby switch between a first state where the display plane of the projection display device is covered with the screen and a second state where the display plane of the projection display device is visible from the front. The display apparatus displays the information provided on the screen in the daytime, and performs display by the projection display device via a window in the screen in the nighttime when there is no effect of external light.

16 Claims, 9 Drawing Sheets

DISPLAY APPARATUS AND INFORMATION DISPLAY SYSTEM USING THE SAME

BACKGROUND OF THE INVENTION

1. Field of Invention

The present invention relates to a display apparatus using a projection liquid crystal display device. More specifically, the present invention relates to a display apparatus having two types of display modes. Furthermore, the present invention relates to an information display system using the display apparatus.

2. Description of Related Art

In various types of display apparatuses that have been proposed, one unit of a projection liquid crystal display device in which light optically modulated by a liquid crystal device is enlarged and projected onto a display plane can exhibit images to many viewers since the display plane is large. In particular, according to a projection display device, a so-called "rear projector", in which optically modulated light is enlarged and projected from the back side of the display plane, since all of optical systems can be disposed on the back side of the display plane, further utilization of the device as an advertising medium can be anticipated.

SUMMARY OF THE INVENTION

According to the projection display device (rear projector), however, since light is projected from the back side of the display plane, there is a problem in that an image becomes difficult to see by reflection of external light when external light shines on the surface of the display plane.

As a typical example of advertising media, a signboard is most common. However, the signboard can only display fixed information; it cannot display moving pictures or the like. In addition, redoing of the displayed content requires much labor and time.

Accordingly, it is an object of the present invention to at least provide a display device which can switch a display mode according to the environment, such as that of the day and night.

According to a first exemplary aspect of the present invention, there is provided a display apparatus which may include: a projection display device for enlarging and displaying an image from the back side of a display plane, a screen disposed on the front side of the display plane of the projection display device, and a screen driving device for moving the screen to thereby switch between a first state where the display plane of the projection display device is covered with the screen and a second state where the display plane of the projection display device is visible from the front.

In this exemplary embodiment of the present invention, since the display plane of the projection display device is covered with the screen in the first state, information provided at the front face of the screen is displayed using the screen as a signboard. In contrast, since the screen is moved and the display plane of the projection display device is in a visible state in the second state, information is displayed by the projection display device. For this reason, if the first state is set in the daytime and the second state is set in the nighttime, a display mode can be switched according to surrounding conditions such that the function of the projection display device is exhibited to the fullest extent in the nighttime in which there is no effect of external light, and in the daytime in which display is affected by the external light, display is performed by the screen which is not affected by the external light. In addition, while the information provided on the screen cannot be as easily as redone as in a signboard, the information displayed by the projection display device can be easily redone if an image signal is changed. Therefore, an advertisement and a guide, which are displayed for a considerably long time, may be displayed using the screen, and information, which is frequently redone, such as event information, may be displayed using the projection display device. In addition, while the screen can display only a fixed image, the projection display device can also display moving images as in a manner similar to that of a television. In this way, the most suitable display mode can be selected from the viewpoints of the type of information to be displayed, the changing cycle of information, etc.

In another exemplary embodiment of the present invention, the projection display device may include, for example, a light source, a liquid crystal device for modulating light emitted from the light source, and a projection optical system for enlarging and projecting light modulated by the liquid crystal device onto the back side of the display plane.

In another exemplary embodiment of the present invention, when the screen has a belt-like shape extending in a moving direction of the screen, the belt-like screen may be preferably formed with a light transmission window for enabling the display plane of the projection display device to be visible in the second state.

In another exemplary embodiment of the present invention, the screen driving device may include, for example, a pair of rollers for winding up and paying out the screen, and a roller driving device for rotatably driving the pair of rollers to switch the position of the screen between the first state and the second state.

In another exemplary embodiment of the present invention, it is preferable that a plurality of information be provided at the front side of the screen in the longitudinal direction of the screen, and the screen driving device intermittently drives the screen in the first state to thereby display the plurality of information by the screen while switching.

In another exemplary embodiment of the present invention, the screen driving device may preferably include, for example, a drive control section for placing the position of the screen in the first state in the daytime, and for placing the position of the screen in the second state in the nighttime.

According to another exemplary aspect of the present invention, there is provided a display apparatus which may include: a projection display device having a display screen, a first roller part disposed on a first side surface of the projection display device, a second roller part disposed on a second side surface of the projection display device opposing the first side surface, a screen disposed along a display screen with one end attached to the first roller part and the other end attached to the second roller part, a projection part provided on the screen for enabling a displayed image from the projection display device to be visible, and an information area formed on the screen.

According to the arrangements, since the screen can be disposed along the side surface of the projection display device, the size of the display apparatus can be reduced.

In another exemplary embodiment of the present invention, the display apparatus may further include a drive control section for controlling the rotation of the first roller part and the second roller part and for moving the screen.

Furthermore, in another exemplary embodiment of the present invention, the drive control section has a time control part, and moves the screen when a predetermined time is reached.

According to this arrangement, information, such as an advertisement or the like, displayed by the screen and the projection display device can be provided based on the set time.

In another exemplary embodiment of the present invention, the screen is detachable with respect to the projection display device.

According to this arrangement, information, such as an advertisement or the like, can be easily replaced.

In another exemplary embodiment of the present invention, the projection part of the screen is a window for exposing a display screen of the projection display device.

In another exemplary embodiment of the present invention, the projection part of the screen projects a displayed image of the projection display device onto the screen.

In another exemplary embodiment of the present invention, the display apparatus may further include a stretching part for stretching the screen at least on both sides of the projection part of the screen.

With this arrangement, since at least the projection part of the screen onto which an image is projected can be prevented from being distorted, a good image can be projected onto the screen.

According to another exemplary aspect of the invention, there is provided an information display system, including: a projection display device having a display section, a display apparatus disposed along the display section of the projection display device and having at least one image area and a screen including a display area for enabling displayed information from the projection display device to be visible, and an information supply section for transmitting displayed information to the display device.

According to the arrangements, information can be provided to a plurality of display apparatuses from one information supply section.

In another exemplary embodiment of the present invention, the display apparatus and the information supply section communicate information bidirectionally via lines.

According to this arrangement, information can be exchanged bidirectionally between the display apparatus and the information supply section, making it possible to hold a specific condition of the display apparatus.

In another exemplary embodiment of the present invention, the display apparatus has a self-check function, and transmits abnormal information of the display apparatus to the information supply section when an abnormality is determined.

According to this arrangement, an abnormality of the display device can be found, making it possible to efficiently check the display apparatus.

DETAILED DESCRIPTION OF PREFERRED EMBODIMENTS

The exemplary embodiments of the present invention will be described with reference to the drawings.

(First Embodiment)

Figure 1:
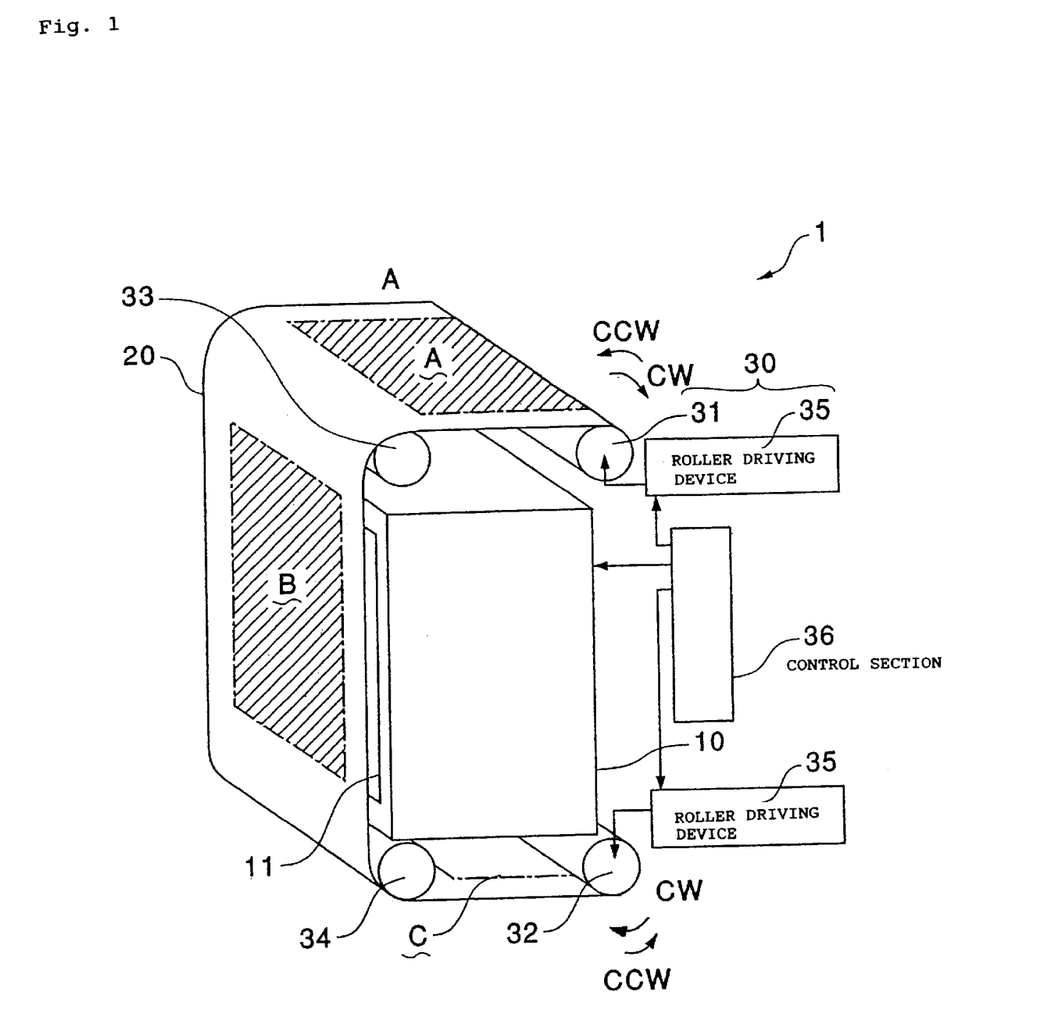
FIG. 1 schematically illustrates the overall construction of a display apparatus to which a first exemplary embodiment of the present invention is applied.
Figure 2:
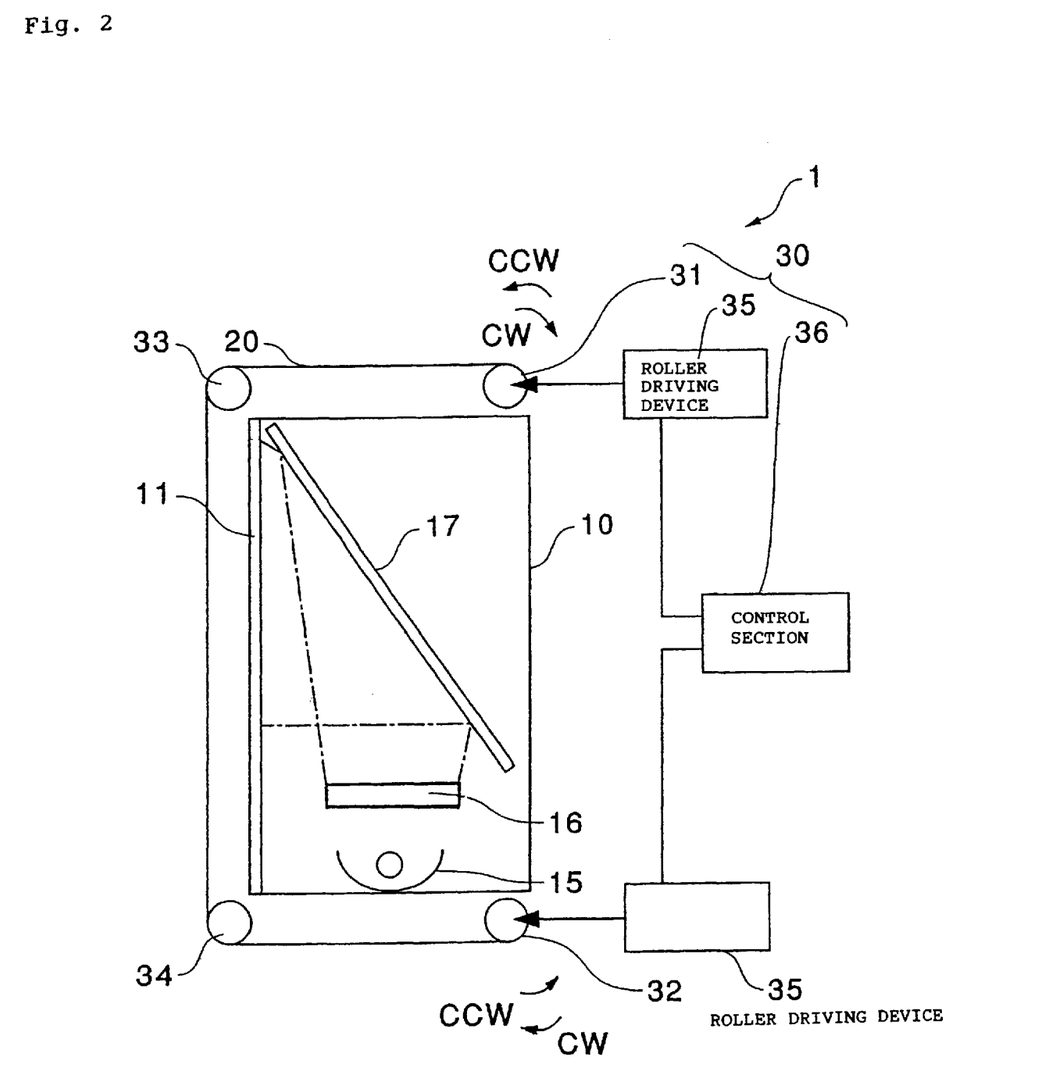
FIG. 2 schematically illustrates the construction of a projection display device used in the display apparatus shown in FIG. 1.
Figure 3:
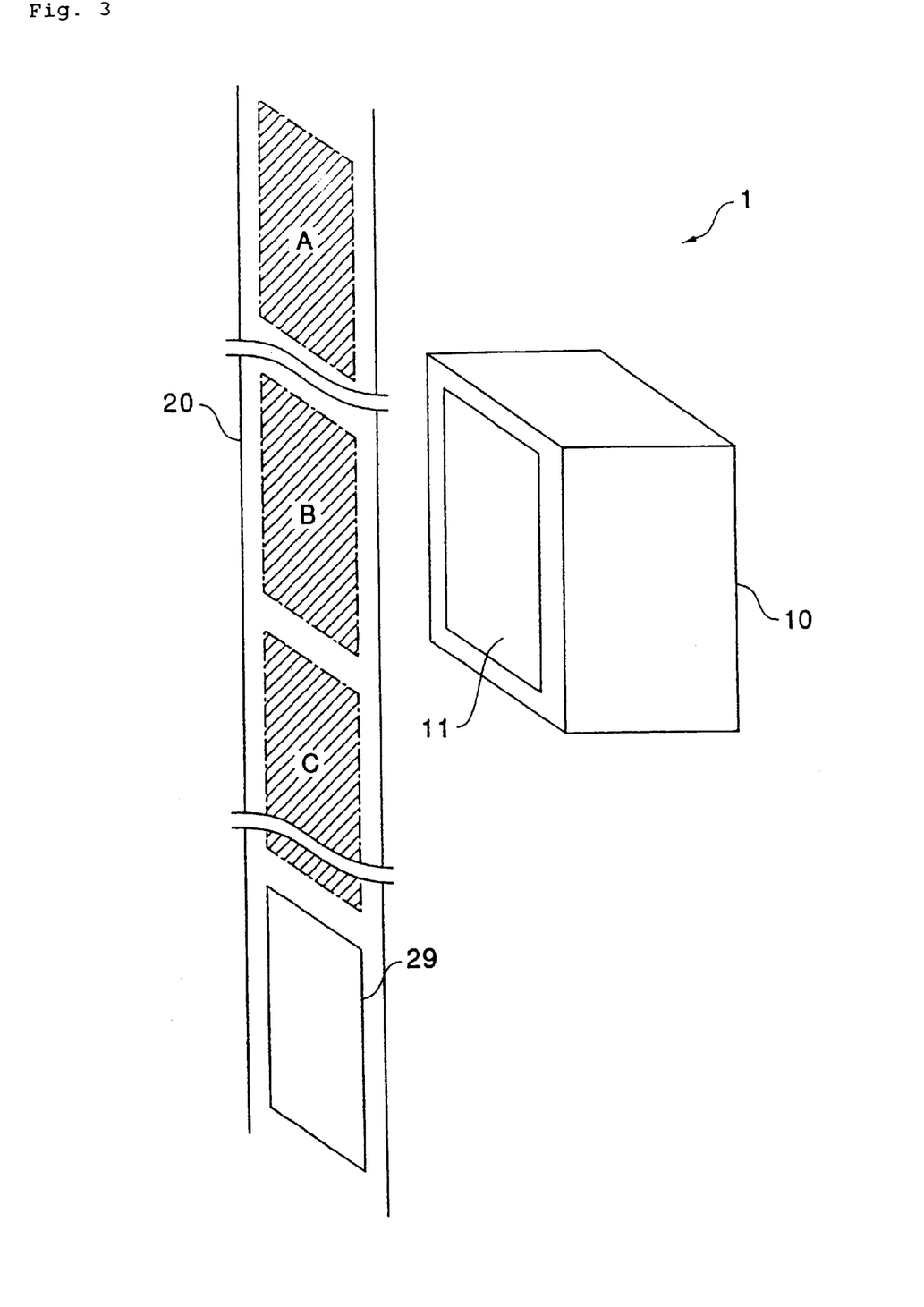
FIG. 3 is an illustration of an exploded view of the display apparatus shown in FIG. 1 which schematically shows constructions of a screen and a projection display device, respectively.
Figure 4:
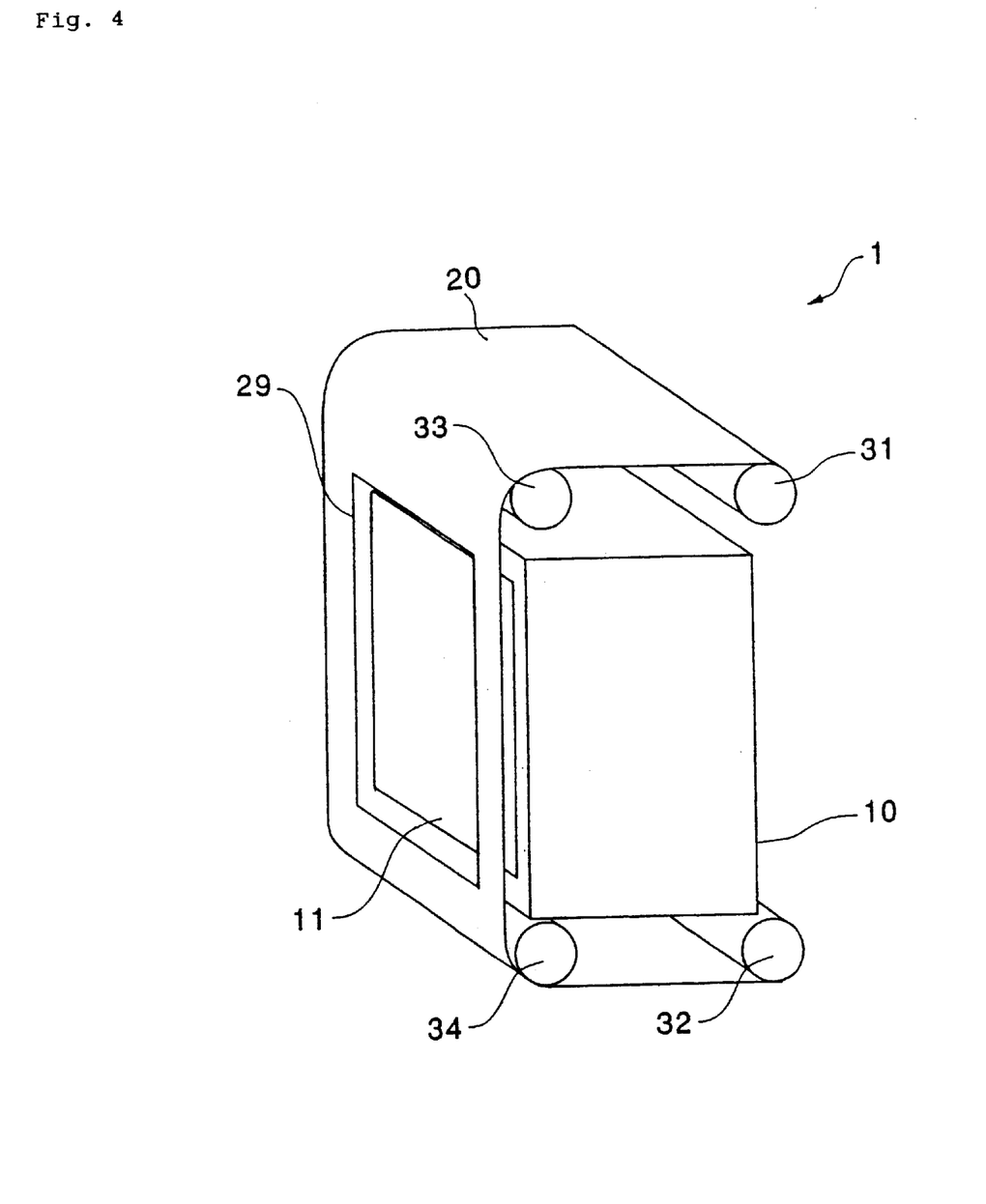
FIG. 4 is an illustration showing a second state where information is displayed by the projection display device in the display apparatus shown in FIG. 1.

FIGS. 1 and 2 schematically show the overall construction of a display apparatus to which a first exemplary embodiment of the present invention is applied, and the construction of a projection display device, respectively. FIG. 3 is an illustration of an exploded view of the display apparatus shown in FIG. 1 which schematically shows constructions of a screen and a projection display device. FIG. 4 is an illustration when the display apparatus shown in FIG. 1 is in a second state.

In FIGS. 1 and 2, a display apparatus 1 of the first embodiment is generally composed of a projection display device 10 (rear projector) in which an image is enlarged and projected from the back side of a display plane 11, a screen 20 disposed on the front side of the display plane 11 of the projection display device 10, and a screen driving device 30 for moving the screen 20.

Since the construction of the projection display device 10 is already known, detailed description thereof will be omitted. For example, the projection display device 10 may include a light source 15, an active-matrix liquid crystal device 16 for modulating light emitted from the light source 15, and a projection optical system 17 including a mirror and the like for enlarging and projecting the light modulated by the liquid crystal device 16 onto the back side of the display plane 11. While only one liquid crystal device 16 is shown in FIG. 2, if a light separation optical system for separating light emitted from the light source into red (R), green (G), and blue (B) light is arranged, three liquid crystal devices 16 for modulating each colored light are used, and light emitted from each of the liquid crystal devices 16 is synthesized by a prism or the like, and is then enlarged and projected onto the display plane 11. Thus, a color image can be displayed on the display plane 11.

As shown in FIG. 3, the screen 20 is shaped like a belt extending in a moving direction (longitudinal direction), and the belt-like screen 20 is formed with a light transmission window 29. In addition, on the front side of the screen 20, information, such as advertisements, is provided in each area in the longitudinal direction of the screen 20.

In the thus-constructed screen 20, when the window 29 is located in front of the display plane 11 of the projection display device 10, as shown in FIG. 4, the display plane 11 of the projection display device 10 is visible through the window 29. Here, the window 29 may be formed either by cutting out the screen 20 or may be formed of a transparent sheet.

In FIGS. 1 and 2 again, the screen driving device 30 may include, for example, a pair of rollers 31 and 32 for winding and unwinding the screen 20, a roller driving device 35 including a motor for intermittently rotatably driving the rollers 31 and 32, and a control section 36 for controlling the roller driving device 35. In addition, the screen driving device 30 may also include tension rollers 33 and 34 for tensioning the screen 20. The rollers 31 and 32 on both ends of the screen 20 are detachable with respect to the roller driving device 35.

The screen driving device 30 moves the screen 20 in the longitudinal direction thereof to switch the display between a first state where a portion of the screen 20 other than the window 29 is located in front of the display plane 11 of the projection display device 10, as shown in FIG. 1, and a second state where the window 29 of the screen 20 is located in front of the display plane 11 of the projection display device 10, as shown in FIG. 4. Here, the screen driving device 30 intermittently moves the screen 20. Even in the first state, the screen driving device 30 first stops the screen 20 with an area to which first information is given located in front of the display plane of the projection display device 10, and then drives the screen 20 so that an area to which second information B is given is located in front of the display plane 11 of the projection display device 10, and thereafter, stops the screen 20 at this position. In addition, after the passage of a predetermined time in this state, the screen driving device 30 moves the screen 20 so that an area in which the information C is provided is located in front of the display plane 11 of the projection display device 10, and then stops the screen 20 at this position.

The screen 20 is driven by controlling the roller driving device 35 with the control section 36 including a timer. The control section 36, for example, places the position of the screen 20 in the first state in the daytime, and places the position of the screen 20 in the second state in the nighttime.

In the thus-constructed display device 1, in the daytime, the portion of the screen 20 other than the window 29 is located in front of the display plane 11 of the projection display device 10 (first state), as shown in FIG. 1. Therefore, according to this display device 1, for example, the information A provided in the first area of the screen 20 can be displayed. In addition, after the passage of a predetermined period, the roller driving device 35 rotatably drives the rollers 31 and 32 in the direction of the arrows CW, respectively, according to a command from the control section 36, and displays the information B provided in the second area of the screen 20. Furthermore, after the passage of a predetermined period, the roller driving device 35 rotatably drives each time the rollers 31 and 32 in the direction of the arrows CW, respectively, according to a command from the control section 36, and displays the information C, . . . , provided in the third area, the fourth area, . . . , sequentially.

When the effects of external light diminishes at night, the roller driving device 35 rotatably drives the rollers 31 and 32 in the direction of the arrows CW, respectively, according to a command from the control section 36 until the window 29 of the screen 20 is located in front of the display plane 11 of the projection display device 10. In this state (second state), the display plane 11 of the projection display device 10 can be viewed from the window 29 of the screen 20. Therefore, various types of information can be displayed in the projection display device 10.

When the state is returned again to the first state at daybreak, the roller driving device 35 moves the screen 20 in the direction (direction of the arrows CCW) opposite to the previous direction so that the portion of the screen 20 other than the window 29 is located in front of the display plane 11 of the projection display device 10 again, as described with reference to FIG. 1, and displays the information A provided in the first area of the screen 20.

In this way, in the display of the first embodiment, a display mode can be switched according to surrounding conditions such that the function of the projection display device 10 is exhibited to the fullest extent in the nighttime in which there is no effect of external light, and in the daytime in which display is affected by the external light, display is performed by the screen 20 which is not affected by the external light.

While the information provided on the screen 20 cannot be as easily redone as in a signboard, the information displayed by the projection display device 10 can be easily redone if image information input to the projection display device 10 is changed. Therefore, an advertisement and a guide, which are displayed for a considerably long time, may be displayed using the screen 20, and information, which is frequently redone, such as event information, may be displayed using the projection display device 10. Therefore, since an advertisement only for a short period, such as several hours, can be easily displayed, a client requesting the advertisement by the display apparatus 1 can minimize advertisement expenses. In addition, while the screen 20 can display only a fixed image, the projection display device 10 can also display moving images in a manner similar to that of a television. Therefore, according to the display apparatus 1 of this embodiment, the most suitable display mode can be selected from the viewpoints of the type of information to be displayed, the changing cycle of information, etc.

(Second Embodiment)

While the image information is displayed on the display plane of the projection display device in the first exemplary embodiment, it is projected onto a screen in a second exemplary embodiment. The same component parts as in the first embodiment are indicated by the same reference numerals, and detailed description thereof will be omitted.

Figure 5:
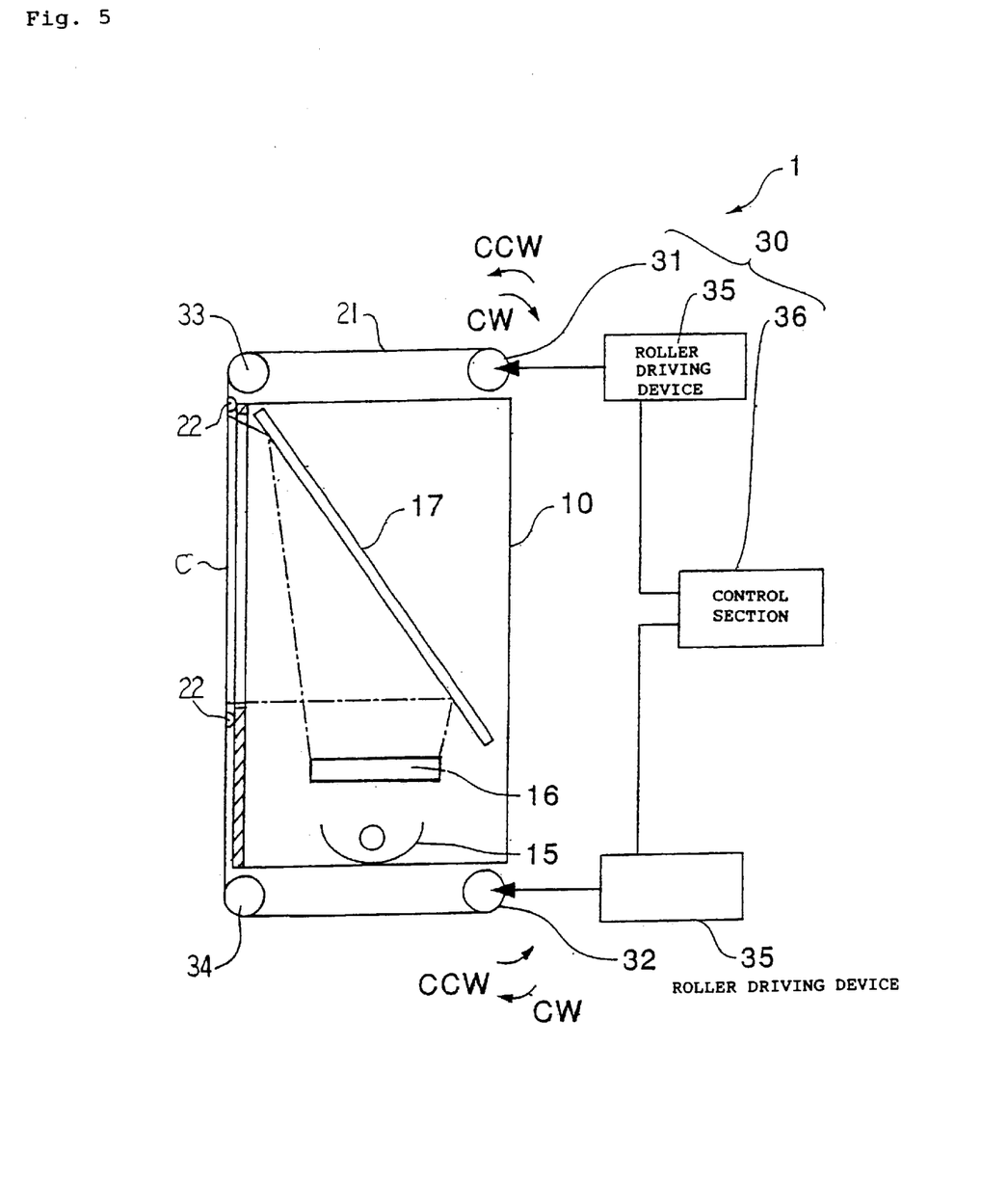
FIG. 5 schematically shows the construction of a projection display device to which a second exemplary embodiment of the present invention is applied.
Figure 6:
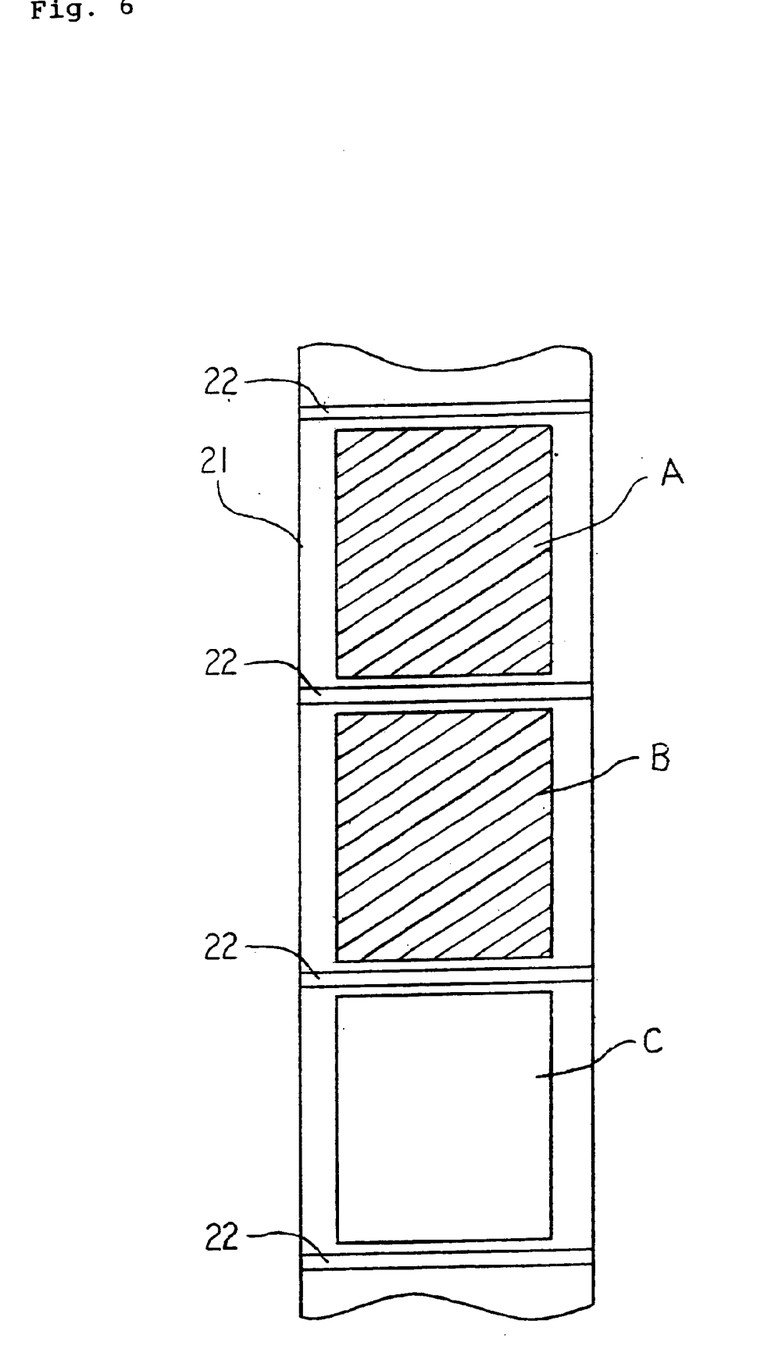
FIG. 6 is an illustration schematically showing a part of a screen of the projection display device shown in FIG. 5.
Figure 7:
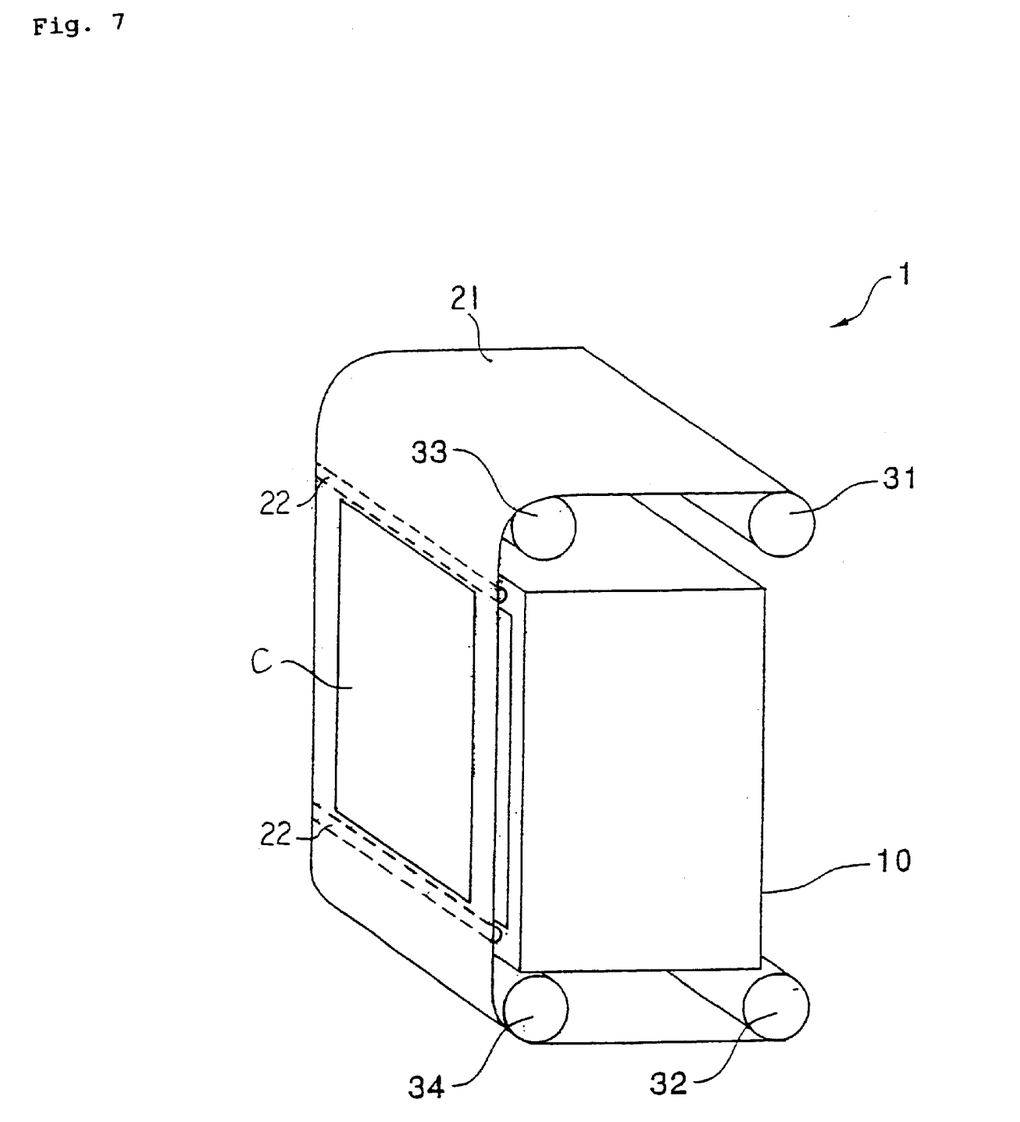
FIG. 7 is an illustration when the display device shown in FIG. 5 is in a second state.

FIG. 5 schematically shows the construction of a projection display device to which the invention of the second embodiment is applied. FIG. 6 is an illustration schematically showing a part of the screen. FIG. 7 is an illustration when the display device shown in FIG. 5 is in a second state.

In the second embodiment, in order to project an image of a projection display device 10 onto a screen 21, positions of a roller 33 and a roller 34 are adjusted so that the distance between a projection part of the projection display device 10 and the screen 21 is shortened. Since the projected image is distorted when the screen 21 is slackened, stretching members 22 are provided on both sides of the printed first information A, the printed second information B, and the projection plane C of the screen 21, respectively. Each stretching member 22 is formed of a rod-like member of metal or synthetic resin, and stretches the screen 21. The stretching members 22 may be provided at least on both sides of the projection plane C.

With this construction, the first information A of the screen 21 or the printed second information B is located in front of the projection part of the projection display device 10 (first state) in accordance with the set time for performing advertising.

When the effects of external light diminish at night, a roller driving device 35 rotatably drives the rollers 31 and 32, respectively, according to a command from a control section 36 until the projection plane C of the screen 21 is located in front of the projection part of the projection display device 10 (second state). In this state, advertisement information is projected onto the projection plane C of the screen 21, and the information can be viewed.

Since the distance between the screen 21 and the projection part of the projection display device 10 is short, and the screen 21 is stretched by the stretching members 22 provided on at least both sides of the projection plane C, an image projected from the projection display device 10 can be clearly projected onto the projection plane C of the screen 21.

(Usage Example of Display Apparatus)

A usage example of the thus-constructed display apparatus 1 will be described with reference to FIG. 8.

Figure 8:
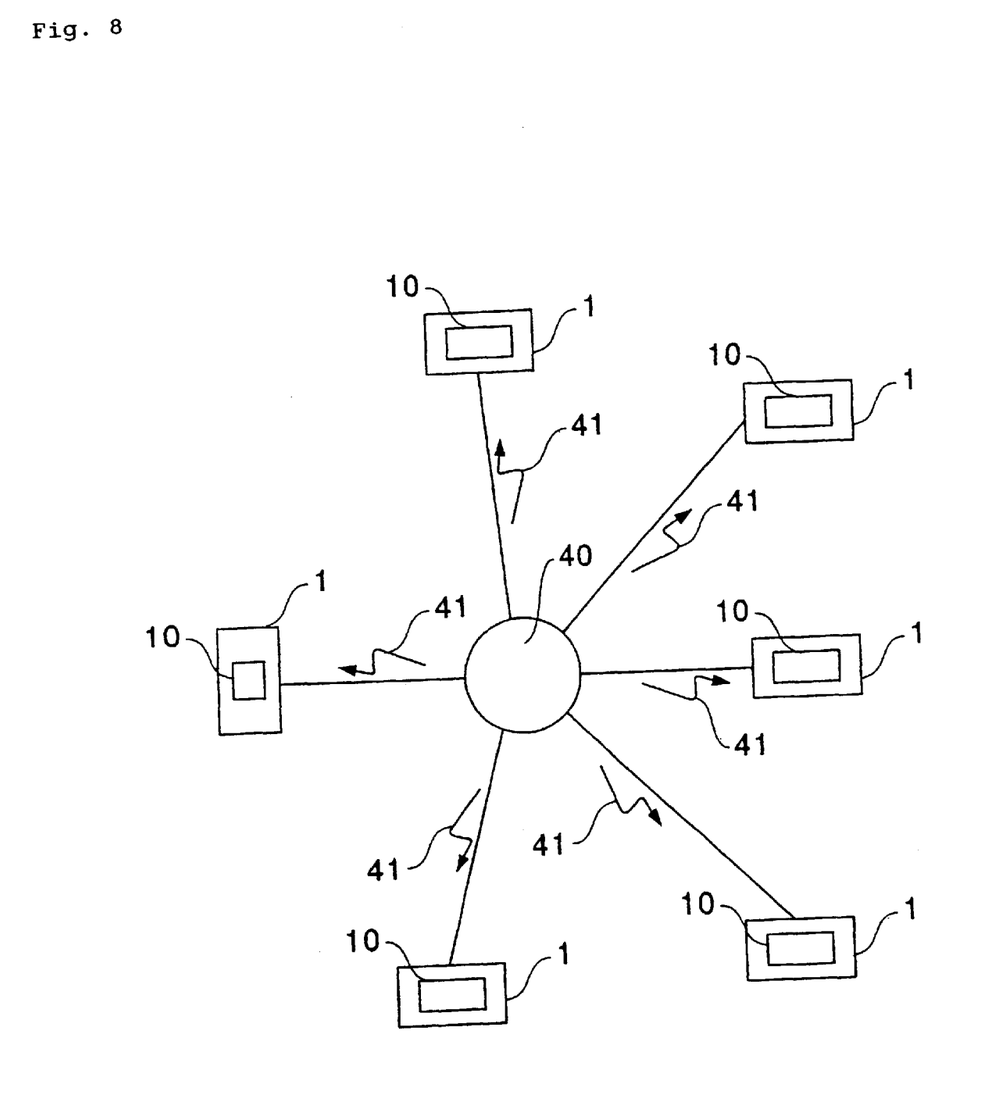
FIG. 8 is an illustration showing the overall construction of an information display system which is assembled using the display apparatuses shown in the first embodiment or the second embodiment as terminals.

FIG. 8 is an illustration showing the overall construction of an information display system which is assembled using display apparatuses 1 as terminals to which the invention of the first embodiment or the second embodiment is applied.

First, the display apparatus 1 of the first or second exemplary embodiments are disposed at predetermined outdoor positions, respectively, and each display apparatus 1 is connected to a server 40 via wires or wirelessly. Here, the server 40 controls information to be displayed by a projection display device 10 of each display apparatus 1. For example, when the information to be displayed by the projection display device 10 of each display apparatus 1 is rewritten, a new image information 41 is output from the server to each display apparatus 1, and the information is rewritten. In addition, when it is desired to display a newsflash, the image information 41 is also output from the server to each display apparatus 1, and the information to be displayed is temporarily rewritten.

(Control Example of Display Apparatus)

A control example of the display apparatus 1 will be described with reference to FIG. 9.

Figure 9:
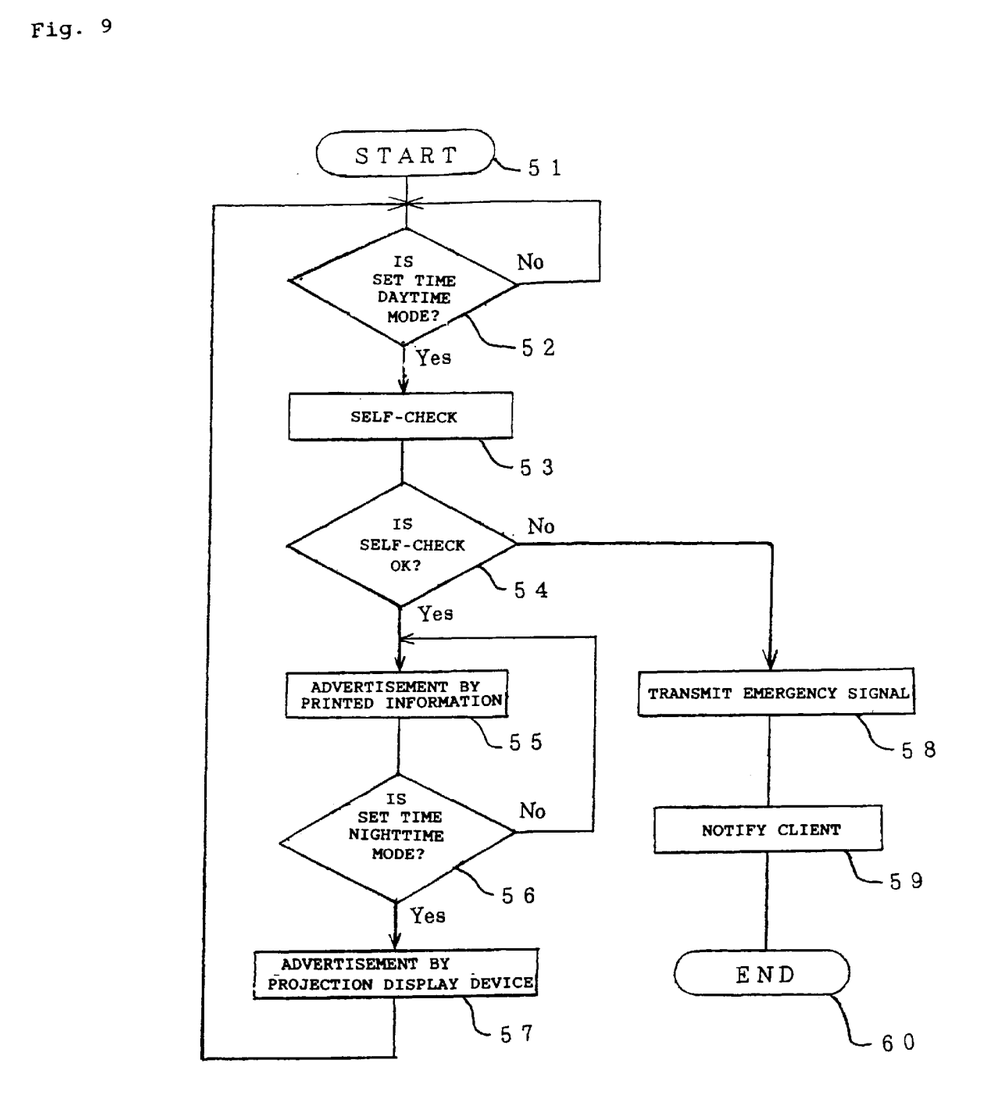
FIG. 9 is a flow chart showing a control example of another information display system.

FIG. 9 is a flow chart showing a control example of an information display system in which display apparatuses 1 are used as terminals in a manner similar to that in FIG. 8, and the display apparatuses 1 are connected to the server 40. While the information display system of FIG. 8 is a system for one-way information transmission from the server 40 to the display apparatuses 1, the information display system of FIG. 9 is a system for two-way information transmission.

Since the information from the server 40 to the display apparatuses 1 is similar to that of FIG. 8, description thereof will be omitted. FIG. 9 shows the information from the display apparatus 1 to the server 40.

Starting in step 51, the procedure advances to step 52, where it is detected whether the set time is a set time of a daytime mode preset by a timer. If the set time of the daytime mode is not yet reached, an advertisement by the projection display device 10 is continuously displayed. If the set time of the daytime mode has been reached, the procedure advances to step 53.

In step 53, a self-check is performed. This self-check is performed by rotating the roller 31 clockwise and counter-clockwise to check whether the control section 36 activates and normally drives the roller driving device 35.

In step 54, as a result of the self-check, it is determined whether the roller driving device 35 is normal or abnormal. When the roller driving device 35 does not operate normally, the procedure advances to step 58 in which the control section 36 transmits an emergency signal to the server 40. In step 59, the server 40 receives the emergency signal, and a host computer notifies a client of a malfunction. This avoids the client from having to check and perform maintenance periodically.

On the other hand, in step 54, as a result of the self-check, when the roller driving device 35 operates normally, the procedure advances to step 55.

In step 55, the roller driving device 35 is operated by the control section 36, and the first information A printed on the screens 20 and 21 is located on the projection part of the projection display device 10 to advertise the first information. While it is not shown in the figure, printed information, such as the printed second information B and the like, is periodically advertised.

In step 56, it is detected whether the set time is a set time of a nighttime mode preset by a timer. If the set time of the nighttime mode is not yet reached, an advertisement of the printed information of the screens 20 and 21 is continuously displayed. If the set time of the nighttime mode has been reached, the procedure advances to step 57.

In this way, according to the information display system for two-way information transmission, checking time by the client can be decreased.

In addition, as an information display system using other information from the display apparatus 1 to the server 40, a system can be mentioned in which a video camera is set on the display apparatus 1, a person who viewed an advertisement is monitored, and information thereof is provided to the client.

While the present invention has been described in detail, the present invention is not limited to the above-described construction, and includes various modified constructions within the range of the spirit and the scope of the present invention.

What is claimed is:

1. A display apparatus, comprising:
   a projection display device having a display plane, the projection display device enlarging and displaying an image from a back side of the display plane;
   a screen disposed at a front side of the display plane of the projection display device, the screen having an information area in which information is provided and a light transmission window; and
   a screen driving device that moves the screen between a first state where the display plane of the projection display device is covered with the information area such that the information provided in the information area is visible to a viewer, and a second state where the display plane of the projection display device is visible to a viewer through the light transmission window; and
   stretching members provided on both sides of the information area of the screen and the light transmission window of the screen.

2. The display apparatus according to claim 1, the projection display device comprising:
   a light source;
   a liquid crystal device that modulates light emitted from the light source; and
   a projection optical system that enlarges and projects light modulated by the liquid crystal device onto the back side of the display plane.

3. The display device according to claim 1, the screen having a belt-like shape extending in a moving direction of the screen, and comprising a light transmission window that enables the display plane of the projection display device to be visible in the second state.

4. The display device according to claim 3, the screen driving device comprising:
   a pair of rollers that winds and unwinds the screen; and
   a roller driving device that rotatably drives the pair of rollers to switch position of the screen between the first state and the second state.

5. The display device according to claim 3, a plurality of information being provided at a front side of the screen in a longitudinal direction of the screen, and the screen driving device intermittently driving the screen in the first state to thereby display the plurality of information by the screen while switching.

6. The display device according to claim 1, the screen driving device comprising:
- a drive control section that positions the screen in the first state in daytime, and that positions the screen in the second state in nighttime.

7. A display apparatus, comprising:
- a projection display device having a display screen member;
- a first roller part disposed on a first side surface of the projection display device;
- a second roller part disposed on a second side surface of the projection display device opposing the first side surface;
- a screen disposed along the display screen member of the projection display device with one end attached to the first roller part and another end attached to the second roller part, the screen having an information area in which information is provided and a projection part, the screen being movable between a first state where the display screen member is covered with the information area, and a second state where the display screen part is visible to a viewer through the projection part; and
- stretching members provided on both sides of the information area of the screen and the projection part of the screen.

8. The display device according to claim 7, further comprising a drive control section that controls rotation of the first roller part and the second roller part and that moves the screen.

9. The display device according to claim 8, the drive control section comprising a time control part, and moving the screen when a predetermined time is reached.

10. The display device according to claim 7, the screen being detachable with respect to the projection display device.

11. The display device according to claim 7, the projection part of the screen being a window that exposes the display screen member of the projection display device.

12. The display device according to claim 7, the projection part of the screen projecting a displayed image of the projection display device onto the screen.

13. An information display system, comprising:
- a display apparatus including a projection display device, the projection display device having a display section, a screen disposed along the display section of the projection display device and having at least one information area and a display area that enables information displayed on the display section of the projection display device to be visible to a viewer, and stretching members provided on both sides of the at least one information area of the screen and the display area of the screen; and
- an information supply section that transmits information to be displayed on the display section of the projection display device.

14. The information display system according to claim 13, the display apparatus and the information supply section communicating information bidirectionally via lines.

15. The information display system according to claim 13, the display apparatus having a self-check function, and transmitting abnormal information of the display apparatus to the information supply section when an abnormality is determined.

16. An information display system, comprising:
- at least two display apparatuses,
  - each of the display apparatuses including a projection display device having a display plane, and a screen disposed at a front side of the display plane of the projection display device, the screen having an information area in which information is pre-provided and a light transmission window; and a screen driving device that moves the screen between a first state where the display plane in the projection display device is covered with the information area and a second state where the display plane in the projection display device is visible through the light transmission window; and
- an information supply section that communications with the display apparatuses, the information supply section transmitting new information to be displayed on the display section of the projection display device in the second state of the screen to each of the display apparatuses when the new information is desired to be displayed.

* * * * *